United States Patent
Givoly

(10) Patent No.: US 9,571,605 B1
(45) Date of Patent: Feb. 14, 2017

(54) SYSTEM, METHOD, AND COMPUTER PROGRAM FOR IDENTIFYING A SOCIAL NETWORK USER IDENTIFIER BASED ON A USER MESSAGE

(75) Inventor: Tal Givoly, Irvine, CA (US)

(73) Assignees: Amdocs Software Systems Limited, Dublin (IE); Amdocs Development Limited, Limassol (CY)

(*) Notice: Subject to any disclaimer, the term of this patent is extended or adjusted under 35 U.S.C. 154(b) by 869 days.

(21) Appl. No.: 12/768,640

(22) Filed: Apr. 27, 2010

(51) Int. Cl.
*H04L 29/08* (2006.01)
*G06F 17/30* (2006.01)
*H04W 4/12* (2009.01)

(52) U.S. Cl.
CPC ....... *H04L 67/306* (2013.01); *G06F 17/30637* (2013.01); *H04W 4/12* (2013.01)

(58) Field of Classification Search
CPC ............ G06F 17/30321; G06F 17/30486; G06F 17/3053; G06F 17/30631; G06F 17/30864; G06F 17/30867; G06F 17/3087; G06F 17/30637; G06Q 30/02; G06Q 50/01; H04L 67/306; H04W 4/12
See application file for complete search history.

(56) References Cited

U.S. PATENT DOCUMENTS

| | | | |
|---|---|---|---|
| 8,006,190 B2* | 8/2011 | Quoc et al. | 715/753 |
| 8,433,762 B1* | 4/2013 | Wald et al. | 709/206 |
| 8,572,191 B2* | 10/2013 | Bonforte | 709/206 |
| 2008/0133657 A1* | 6/2008 | Pennington | G06Q 30/02 709/204 |
| 2008/0233984 A1* | 9/2008 | Franklin | 455/466 |
| 2009/0089417 A1* | 4/2009 | Giffin et al. | 709/224 |
| 2010/0057732 A1* | 3/2010 | O'Sullivan et al. | 707/6 |
| 2010/0077045 A1* | 3/2010 | Bercu et al. | 709/206 |
| 2010/0199340 A1* | 8/2010 | Jonas et al. | 726/8 |
| 2010/0255861 A1* | 10/2010 | Raviv et al. | 455/466 |
| 2011/0196855 A1* | 8/2011 | Wable et al. | 707/711 |
| 2011/0196935 A1* | 8/2011 | Rideout | G06Q 10/107 709/206 |
| 2011/0201320 A1* | 8/2011 | Wosk et al. | 455/415 |
| 2011/0264648 A1* | 10/2011 | Gulik et al. | 707/722 |

FOREIGN PATENT DOCUMENTS

WO 2009/022356 2/2009 ............ H04W 4/20

\* cited by examiner

*Primary Examiner* — Shew-Fen Lin
(74) *Attorney, Agent, or Firm* — Zilka-Kotab, PC

(57) ABSTRACT

A system, method, and computer program product are provided for identifying a social network user identifier based on a user message. In use, a message is received from a user. Additionally, content is extracted from the message. Further, a search is performed using at least a portion of the content. Moreover, an identifier of the user provided by a social network is identified, based on the search.

6 Claims, 7 Drawing Sheets

SYSTEM, METHOD, AND COMPUTER PROGRAM FOR IDENTIFYING A SOCIAL NETWORK USER IDENTIFIER BASED ON A USER MESSAGE

FIELD OF THE INVENTION

The present invention relates to user identities, and more particularly to identifying social network user identifiers.

BACKGROUND

To date, a third party typically does not know the identity of social network users unless each user explicitly provides to the third party information from which the user's identity can be derived. Thus, some third parties have provided users incentives or other motivations in exchange for disclosure by the users of their social network user identities. Unfortunately, such methods utilized by third parties to gain knowledge of users' social network user identities have exhibited various limitations, such as requiring the users to provide their social network user identities as described above.

There is thus a need for addressing these and/or other issues associated with the prior art.

SUMMARY

A system, method, and computer program product are provided for identifying a social network user identifier based on a user message. In use, a message is received from a user. Additionally, content is extracted from the message. Further, a search is performed using at least a portion of the content. Moreover, an identifier of the user provided by a social network is identified, based on the search.

DETAILED DESCRIPTION

Figure 1:
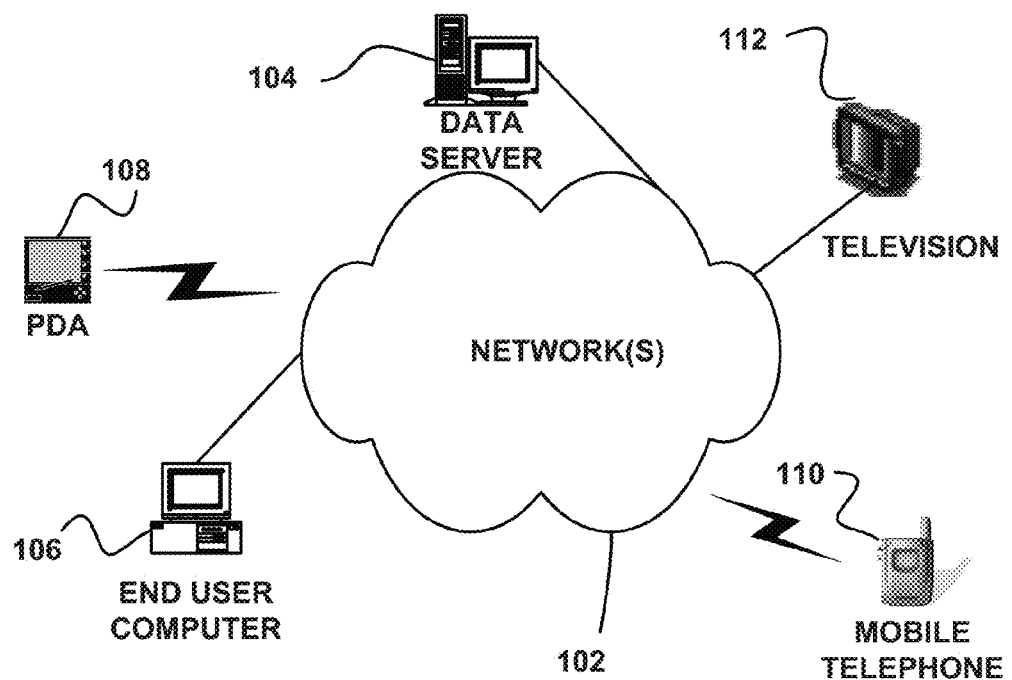
FIG. 1 illustrates a network architecture in which systems and methods consistent with aspects of the present invention may be implemented.

FIG. 1 illustrates a network architecture 100, in which systems and methods consistent with aspects related to the present invention may be implemented. As shown, network architecture 100 includes at least one network 102. The network 102 may take any form including, but not limited to a telecommunications network, a local area network (LAN), a wireless network, a wide area network (WAN) such as the Internet, peer-to-peer network, cable network, etc. Further, while only one network is shown, it should be understood that two or more similar or different networks 102 may be provided. In one example of a multi-network configuration of network 102, network 102 may comprise a wireline network (e.g., WAN, LAN, etc.) communicatively coupled to a wireless network (e.g., Universal Mobile Telecommunications System (UMTS), Global System for Mobile Communications (GSM), etc.].

As shown, several exemplary devices may be coupled to the network 102. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
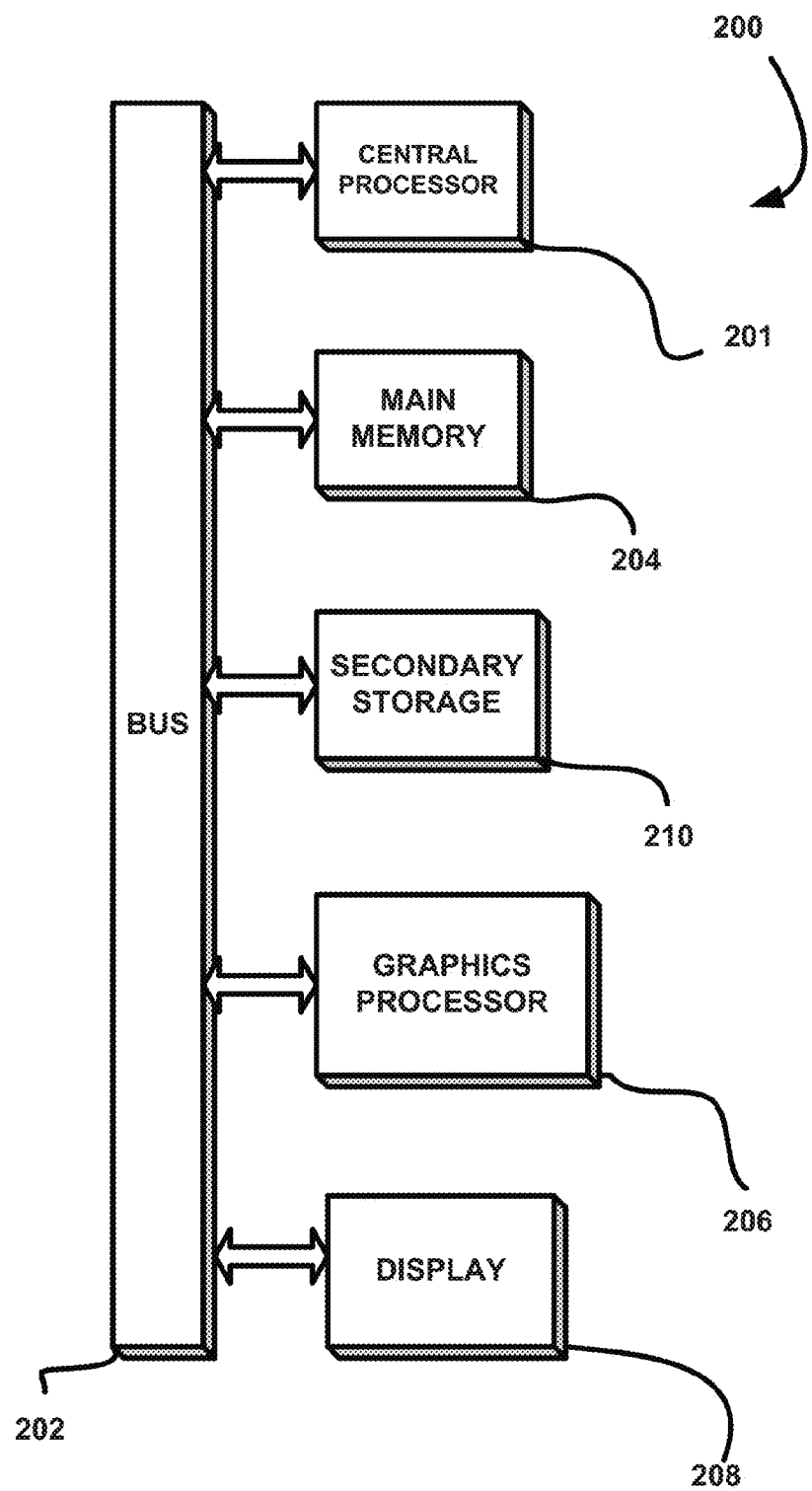
FIG. 2 is a block diagram of components of a device in which systems and methods consistent with aspects of the present invention may be implemented.

FIG. 2 is a block diagram showing components of a device 200, in which systems and methods consistent with aspects related to the present invention may be implemented. As an option, device 200 may be implemented in the context of any of the devices of the network architecture 100 of FIG. 1. Of course, the device 200 may be implemented in any desired environment.

As shown, a device 200 is provided including at least one central processor 201 which is connected to a communication bus 202. The device 200 also includes main memory 204 (e.g., random access memory (RAM).). The device 200 also includes a graphics processor 206 and a display 208.

The device 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the device 200 to perform various functions (to be set forth below, for example). Memory 204, storage 210 and/or any other storage are possible examples of tangible computer-readable media.

Figure 3:
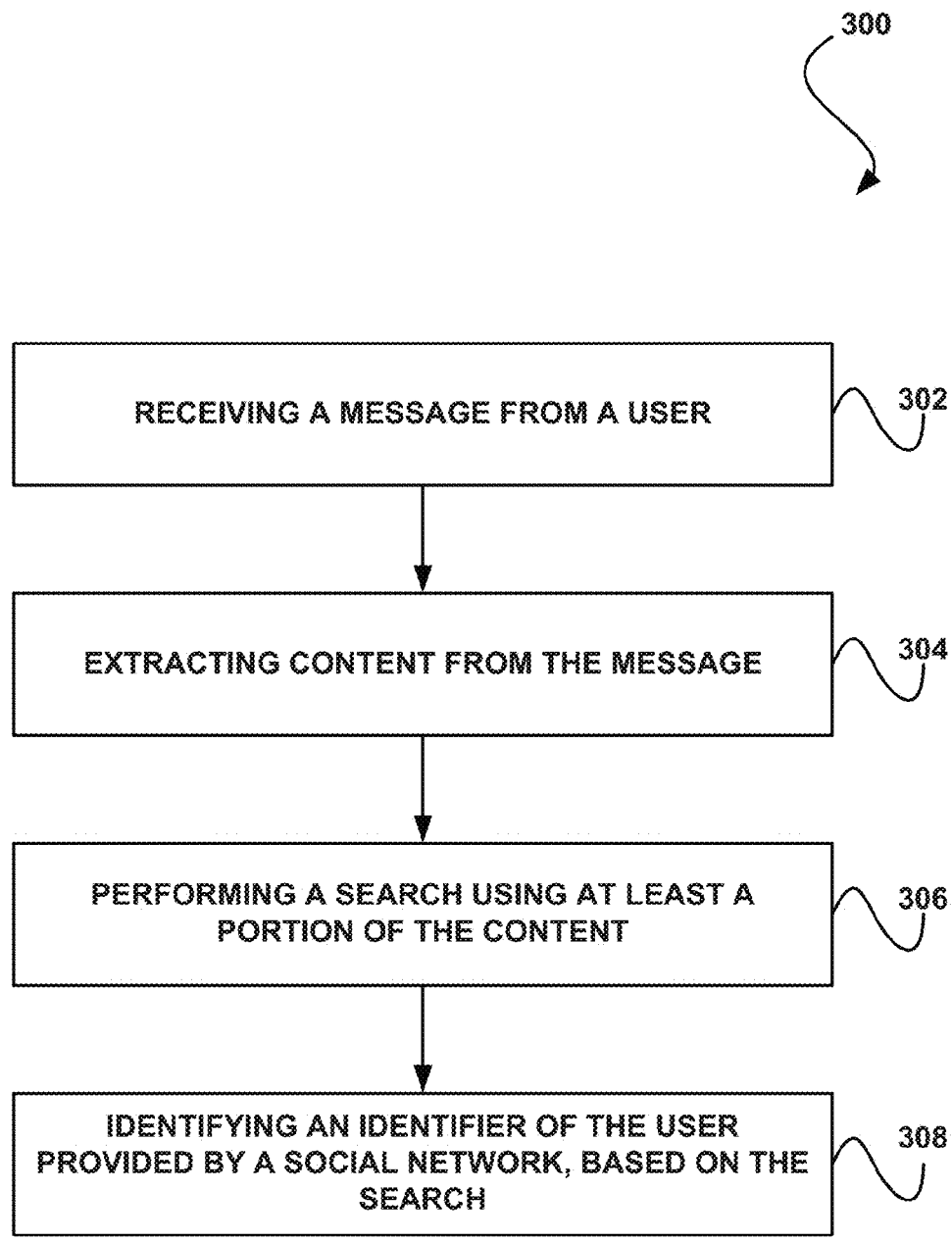
FIG. 3 illustrates a method for identifying a social network user identifier based on a user message, in accordance with one implementation consistent with aspects of the present invention.

FIG. 3 illustrates a method 300 for identifying a social network user identifier based on a user message, in accordance with one implementation consistent with aspects related to the present invention. As an option, the method 300 may be carried out in the network architecture 100 and using device 200 of FIGS. 1 and/or 2. Alternatively, the method 300 may be carried out in any desired environment and device.

As shown in operation 302, a message is received from a user. With respect to the present description, the user may include any person utilizing an electronic device to send a message. For example, the user may include a user of a mobile phone, a PDA, a smartphone, a personal computer, and/or any of the devices described above with respect to FIGS. 1 and/or 2. Consistent with one aspect related to the present invention, the device utilized by the user and from which the message is received may be capable of connecting to a network over which the message may be transmitted, browsing a network (e.g., the Internet), etc.

It should also be noted that the message may include any type of message that is received from the electronic device of the user and from which content may extracted, as noted below. For example, the message may be transmitted from the electronic device of the user utilizing a network. In various implementations, the message may include a short message service (SMS) message, an instant message, an electronic mail (email) message, a status update, etc.

Further, the message may be utilized by the user for modifying (e.g., updating, editing, etc.) at least one aspect associated with a social network utilized by the user. Consistent with one aspect related to the present invention, the message may be utilized by the user for modifying at least part of a web page personalized for the user and provided by the social network. Just by way of example, the message may include a tweet sent to a Twitter™ account of the user for display on a web page personalized for the user and provided by Twitter™.

It should be noted that with respect to the present description, the social network may include any network providing social networking capabilities to users (e.g., subscribers to the social network). Such social networking capabilities may include establishing connections between user identities created via the social network, allowing communications between users of the social network, etc. For example, the social network may include a social networking website (e.g., Twitter™, Facebook™, Linkedin™, YouTube™, etc.) or any other social networking applications or social media (e.g., available via the Internet).

Optionally, the message may be automatically received from the user in response to the user transmitting the message to a provider of the social network. For example, the message may be received by a message controller (e.g., SMS controller) utilized for communicating the message from an electronic device of the user to a device to which the message is destined (e.g., a device utilized by the provider of the social network for providing the social network). Of course, however, the message may be received from the user in any desired manner.

Additionally, content is extracted from the message, as shown in operation 304. With respect to the present description, the content that is extracted from the message may include any data, headers, etc. included in the message. Optionally, all content of the message may be extracted, or only predetermined portions (e.g., predetermined headers, a body, etc.) of the message may be extracted.

In one implementation, the content that is extracted may include data included in the message that is configured (e.g., entered, composed, etc.) by the user. For example, the data may be that which is configured for use in modifying the aspect(s) associated with the social network utilized by the user. To this end, the data may include text, an image, a uniform resource locater (URL), etc.

In another implementation, the content may include an identifier of the user. Optionally, the identifier of the user may be determined based on a source of the message, such as a source identifier included in the message (e.g., a phone number, an electronic device identifier, etc.). By way of example, the identifier of the user may be determined utilizing a mapping of the source identifier to the identifier of the user.

It should be noted that the aforementioned content may be extracted (e.g., retrieved) from the message in any desired manner. For example, the message may be parsed into a plurality of subparts (e.g., headers, body, strings, words, phrases, etc.). Thus, the content may be identified utilizing the parsing.

Further, as shown in operation 306, a search is performed using at least a portion of the content. In one implementation, it may be determined which of the content is to be utilized for performing the search. Optionally, all of the content may be utilized for performing the search, or only a portion of the content may be utilized for performing the search (e.g., as selected based on a predetermined algorithm, which will be described in more detail below with respect to FIG. 4).

Additionally, the search may include any operation, function, query, etc. utilized for finding the content or portion thereof within a predetermined location. In one implementation, the search may be performed within a network (e.g., the Internet). For example, the search may be performed utilizing a search engine or a plurality of search engines each capable of searching a plurality of data and/or social networks located on the network.

In another implementation, the search may be performed within a predetermined website (e.g., utilizing a search engine of the website, etc.). For example, the search may be performed within a particular social network (e.g., provided for use by users via the website). In yet another implementation, the search may be performed within a plurality of predetermined websites (e.g., social networks).

To this end, the search may be performed with respect to a predetermined location for identifying a specific place (e.g., webpage, URL, etc.) at which the content or portion thereof is stored, displayed, etc. While use of search engines for searching for the content or portion thereof has been described above, it should be noted that the search for the content or portion thereof may be performed in any other desired manner. For example, in yet another implementation the search may be performed by invoking an application program interface (API) to query for the content or portion thereof.

Moreover, as show in operation 308, an identifier of the user provided by a social network is identified, based on the search. In one implementation, the identifier of the user may be utilized by the social network for identifying an account of the social network established by, maintained for, etc. the user. By way of example, the identifier of the user may include a username.

Thus, the identifier of the user may optionally be utilized by the social network to uniquely identify the user. As another option, the identifier of the user may optionally be utilized by the user for establishing connections via the social network. As yet another option, the identifier of the user may optionally be utilized by other users of the social network for locating a webpage of the social network that is personalized for the user.

It should be noted that the identifier of the user that is provided by the social network may be identified in any manner that is based on the search. For example, at least one result of the search may be received which indicates the identifier of the user, such that the identifier of the user provided by the social network may be identified from the one or more results. With respect to the present description, each result may match the content or portion thereof that is searched and may be associated with one or more social networks (e.g., depending on the location within which the search is performed).

In one implementation, the result of the search may include the content and may further include an identifier of the user as the user that authored the content. In another implementation, the result of the search may include a link to a webpage of the social network on which the content is displayed that is personalized for the user and that displays the identifier of the user. Thus, if all results of the search indicate a single identifier of the user that is provided by a single social network, such indicated identifier of the user may be identified as the identifier of the user.

As another example, in response to a plurality of results of the search being received, a user identifier associated with each of the results may be identified. Further, such identified user identifiers may be compared to potential social network user identifiers previously identified for the user based on another message received from the user. Such potential social network user identifiers may have been previously identified for the user based on another message received from the user in the same manner as that in which the user identifiers are identified based on the message received in operation 302.

Still yet, the identifier of the user provided by the social network may be identified based on a single match between the user identifiers associated with the aforementioned results and the potential social network user identifiers. Of course, if multiple matches are identified between the user identifiers associated with the aforementioned results and the potential social network user identifiers, the matched user identifiers may be stored as the potential social network user identifiers, and utilized when a next message is received from the user in the same manner as that described above. Thus, the method 300 may be repeated until an identifier of the user from which the message is received is known. The method 300 may be fully automated or performed without any operator intervention. Alternatively, an operator may perform aspects of the method, including for example, disambiguation or resolution of part or all of the content reviewed in operation 308.

By identifying an identifier of the user that is provided by the social network (hereinafter referred to as the social network identifier of the user) in the manner described above (e.g. in an automated manner), a requirement that the user manually provide the social network identifier of the user in order for such social network identifier of the user to be identified may be avoided. Moreover, such social network identifier of the user may optionally be utilized for a variety of purposes. For example, any aspect associated with the user that is identifiable using the social network identifier of the user may be determined. In one embodiment, the aspect may be identified from a webpage of the social network that is maintained, personalized, etc. for the user. Such identifiable aspects may include a level of influence over other social network users that is had by the user, a domain in which such influence is exerted, interests of the user, habits of the user, profile criteria indicated by the user, etc.

In other implementations, a social connection with the user may be requested via the social network utilizing the social network identifier of the user, such that subsequent messages sent by the user may not necessarily need to be received for extracting the content therein in order to identify content being sent to social networks by the user. Such social connection may further be utilized to determine when, how often, etc. the user sends content to the social network, the social network identifiers of other users with social connections to the user via the social network, a number of such other users, and/or the identifiable aspects noted above.

Furthermore, such identifiable aspects may include business intelligence that may be utilized for determining cross-sell opportunities to be sent to the user, up-sell opportunities to be sent to the user, determining marketing campaigns to be sent to the user, churn prevention with respect to other users influence by the user, fraud detection and prevention associated with the user, improving a customer experience for the user, etc. Optionally, the identifiable aspect may also be used to personalize services for the user (e.g., by giving service updates, promotions that are unique to the user's interests). As another option, the identifiable aspect may be used to improve services, such as a network, for other users of the social network that are influenced by the user, such as services that may have an impact on the other users influenced by the user (e.g., by improving a service if the user leaves a subscription to the service to prevent the other users influenced by the user from leaving the service, for example, by providing the other users incentives, promotions that contract them with the service for an additional amount of time, etc.).

More illustrative information will now be set forth regarding various optional architectures and uses in which the foregoing method may be implemented, per the desires of the user. It should be strongly noted that the following information is set forth for illustrative purposes and should not be construed as limiting in any manner. Any of the following features may be optionally incorporated with or without the exclusion of other features described.

Figure 4:
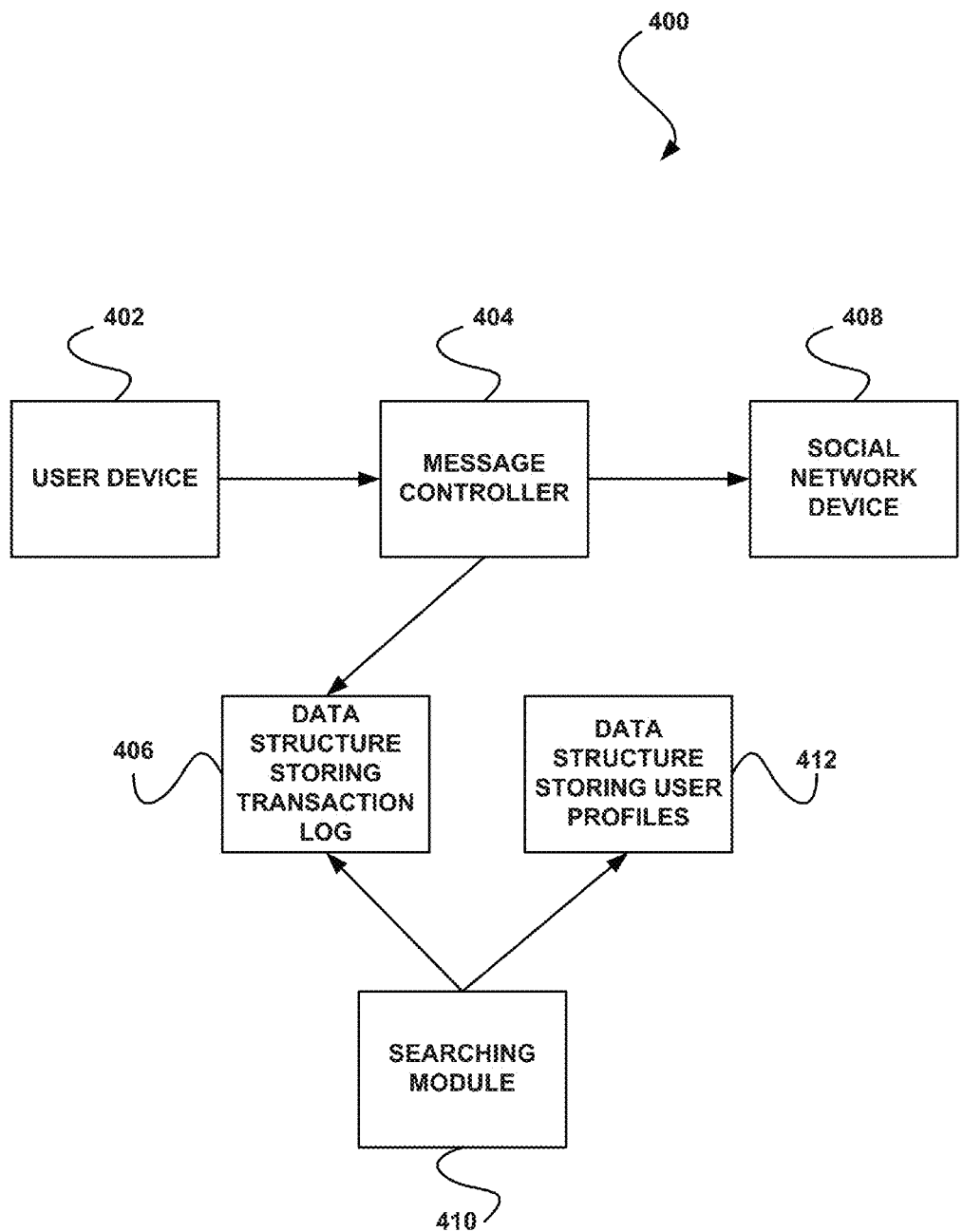
FIG. 4 illustrates a system for identifying a social network user identifier based on a user message, in accordance with aspects of the present invention.

FIG. 4 illustrates a system 400 for identifying a social network user identifier based on a user message. As an option, the system 400 may be implemented in the context of the details of FIGS. 1-3. Of course, however, the system 400 may be implemented in any desired environment. Further, the aforementioned definitions may equally apply to the description below.

As shown, a user device 402 is in communication with a message controller 404, either directly or indirectly. The user device 402 may include any electronic device via which a user may transmit (e.g., broadcast) a message for receipt by a social network device 408 via the message controller 404. Accordingly, the user device 402 and the message controller 404 may be in communication via a network, radio, a wired link, a television set top box, etc. for allowing the user device 402 to transmit the message to the message controller 404. In addition, the message controller 404 and the social network device 408 may be in communication, either directly or indirectly, for allowing the social network device 408 to receive the message from the message controller 404.

It should be noted that the message may be transmitted from the user device 402 in any desired manner. As noted above, the message may be transmitted from the user device 402 for receipt by the social network device 408. Such social network device 408 may provide a social network for use by the user. For example, the message may be utilized by the user for modifying at least one aspect of the social network.

In one implementation, the message may be transmitted in response to the user sending an SMS message to a predefined number associated with the social network device 408. In another implementation, the message may be transmitted in response to the user entering the message via a URL associated with the social network device 408. In yet another implementation, the message may be transmitted in response to the user entering the message into a webpage associated with the social network device 408. In still another implementation, the message may be transmitted in response to the user using an application on the user device 402 to enter the message, where such application sends the message as a particular protocol.

To this end, a message transmitted by the user device 402 is received by the message controller 404. The message controller 404 may include an SMS center (SMSC), a message service center (MSC), a probe, etc. In other configurations consistent with aspects related to the invention, the message controller 404 may intercept messages sent between the user device 402 and the social network device 408, as opposed to acting as an intermediary and relaying the messages as shown in FIG. 4.

Upon receipt of a message, the message controller 404 may log the message in a data structure 406 storing a transaction log. The data structure 406 storing the transaction log may include a database, a web service, an API, and/or any other data structure via which a transaction log may be accessed for logging the message therein. Optionally, message controller 404 may log additional information associated with the message, such as e.g., a time in which the message was transmitted from the user device 402, received by the message controller 404, etc.

In the configuration illustrated in FIG. 4, the message controller 404 may further forward the message to the social network device 408. In this way, the social network device 408 may act on the message as appropriate. For example, the social network device 408 may modify at least one aspect of a webpage of the social network that is personalized for the user, based on content of the message.

As also shown, a searching module 410 accesses the data structure 406 storing the transaction log for receiving the message. It should be noted that the searching module 510 may include a server or any other device including logic capable of accessing the data structure 406 storing the transaction log for receiving the message and of performing the functionality described below. The searching module 410 may periodically access to the data structure 406 storing the transaction log for receiving the message, may receive an indication from the message controller 404 of the message being logged in the data structure 406 storing the transaction log, etc. In this way, the searching module 510 may receive the message from the data structure 406 storing the transaction log.

The searching module 410 may then extract content from the message. In one implementation, the searching module 410 may extract an identifier of the user from the content. Optionally, the searching module 410 may query a data structure 412 storing user profiles for the identifier of the user. Such query may be utilized for determining whether an identifier of the user provided by a social network is already known. For example, the query may determine whether an identifier of the user provided by the social network to which the message is destined is mapped (e.g., via a user profile) to the identifier of the user extracted from the message. In this way, if the identifier of the user provided by a social network is already known, the searching module 410 may avoid any further searching for such identifier of the user provided by a social network.

In another implementation, the query may be utilized for determining whether any potential identifiers of the user provided by a social network (hereinafter potential social network user identifiers) have previously been identified for the user based on a previously received message from the user. For example, the query may determine whether such potential social network user identifiers are mapped (e.g., via a user profile) to the identifier of the user extracted from the message. If the searching module 410 determines that the identifier of the user provided by a social network is not already known, the searching module 410 may perform a search for such identifier using at least a portion of the content.

The searching module 410 may select at least a portion of the content from the content extracted from the message. Thus, the searching module 410 may select an entirety of the content or only a portion of the content for which the search is performed. For example, such portion or entirety of the content may be selected utilizing a predetermined algorithm. Optionally, the predetermined algorithm may select content making up a body of the message, content of the message exclusive of articles (e.g., "the", "a", etc.) in such content, a predetermined number of uncommon strings included in the content (e.g., URLs, proper names, or any other type of content predetermined to be uncommonly included in messages), etc.

By selecting only a portion of the content, privacy of the user may be maintained. For example, if the search is performed utilizing a public search engine, publication of the content to the public search engine (and thus to an entity providing the search engine and/or monitoring searches performed utilizing the search engine) on the part of the searching module 410 searching for an entirety of such content may be avoided.

It should be noted that the search may be performed within any predetermined location, such as a particular social network, etc. The search may accordingly identify places (e.g., webpages) within the searched location in which the selected portion or entirety of the content is located (e.g., stored, displayed, etc.). For example, results of the search may indicate the places in which the selected portion or entirety of the content is located, in addition to identifiers of users provided by social networks that have published such content via the social networks, etc.

Based on the search e.g., results, for example, the searching module 410 may identify an identifier of the user provided by a social network. For example, if all results of the search indicate a single identifier of a user that is provided by a single social network, such indicated identifier of the user may be identified as the identifier of the user provided by the social network.

As another example, in response to a plurality of results of the search being received in which multiple of the results indicate different identifiers of users that are provided by a social network, the different identifiers may be compared to the aforementioned potential social network user identifiers retrieved from the data structure 412 storing the user profiles. If a single match between the different identifiers of users that are provided by a social network and the potential social network user identifiers is identified, the matched identifier of a user that is provided by a social network may be identified as the identifier of the user (from which the message was received) that is provided by the social network (e.g., to which the message was transmitted).

If multiple matches between the different identifiers of users that are provided by a social network and the potential social network user identifiers are identified, such potential social network user identifiers may be replaced in the data structure 412 storing the user profiles with only those different identifiers of users that are provided by a social network matching the potential social network user identifiers. Furthermore, if no matches between the different identifiers of users that are provided by a social network and the potential social network user identifiers are identified, the potential social network user identifiers may be removed from the data structure 412 storing the user profiles (e.g., because it may undeterminable which search was unsuccessful in identifying an identifier of the user provided by the social network).

However, if none of the potential social network user identifiers were stored, and thus retrieved, from the data structure 412 storing the user profiles, the different identifiers of users that are provided by a social network which were identified from the results of the search may be stored in the data structure 412 storing the user profiles as potential social network user identifiers in association with the identifier of the user extracted from the message. In this way, results of a next search associated with a subsequently received message from the user (as identified in the same manner as that described above) may be compared to the potential social network user identifiers stored in the data structure 412 storing the user profiles for identifying an identifier of the user that is provided by the social network.

It should be noted that the searching module 410, message controller 404, data structure 406 storing the transaction log, and the data structure 412 storing the user profiles, or any combination thereof, may be components of a single service provider (e.g., network service provider) providing a communications service allowing communication between the user device 402 and the social network device 408. Further, while shown separate, the data structure 406 storing the transaction log and the data structure 412 storing the user profiles may optionally be a single data structure storing the transaction log and the user profiles.

In addition, the user of the user device 402 may be a subscriber to such communications service, such that the service provider may identify a social network user identifier of the user for retrieving information associated with such social network user identifier. The service provider may then optionally utilize such information customizing offers, services, etc. for the user.

As an option, the searching module 410 may monitor availability and/or operations of the social network device 408 sending and/or search engine functionality utilized by the searching module 410, such that if the functionality is determined to not be performing as expected (based on previous use thereof by the searching module 410), the aforementioned operations of the searching module 410 may be delayed, cancelled, or altered to be performed when the functionality of the social network device 408 is determined to be performing as expected.

Figure 5A:
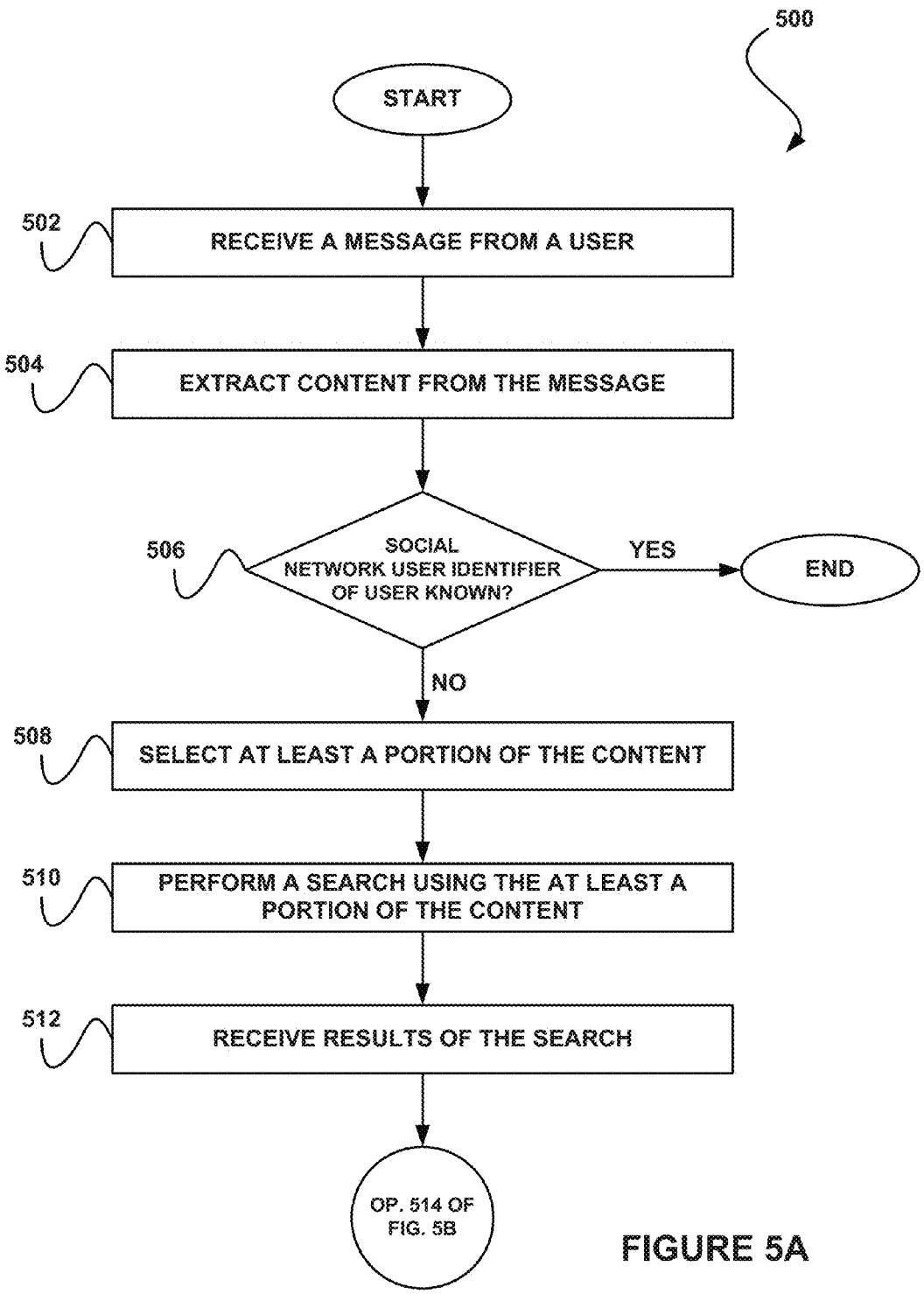
FIGS. 5A-C illustrate a method for correlating a social network user identifier for a user with a profile of the user, in accordance with one implementation consistent with aspects of the present invention.
Figure 5B:
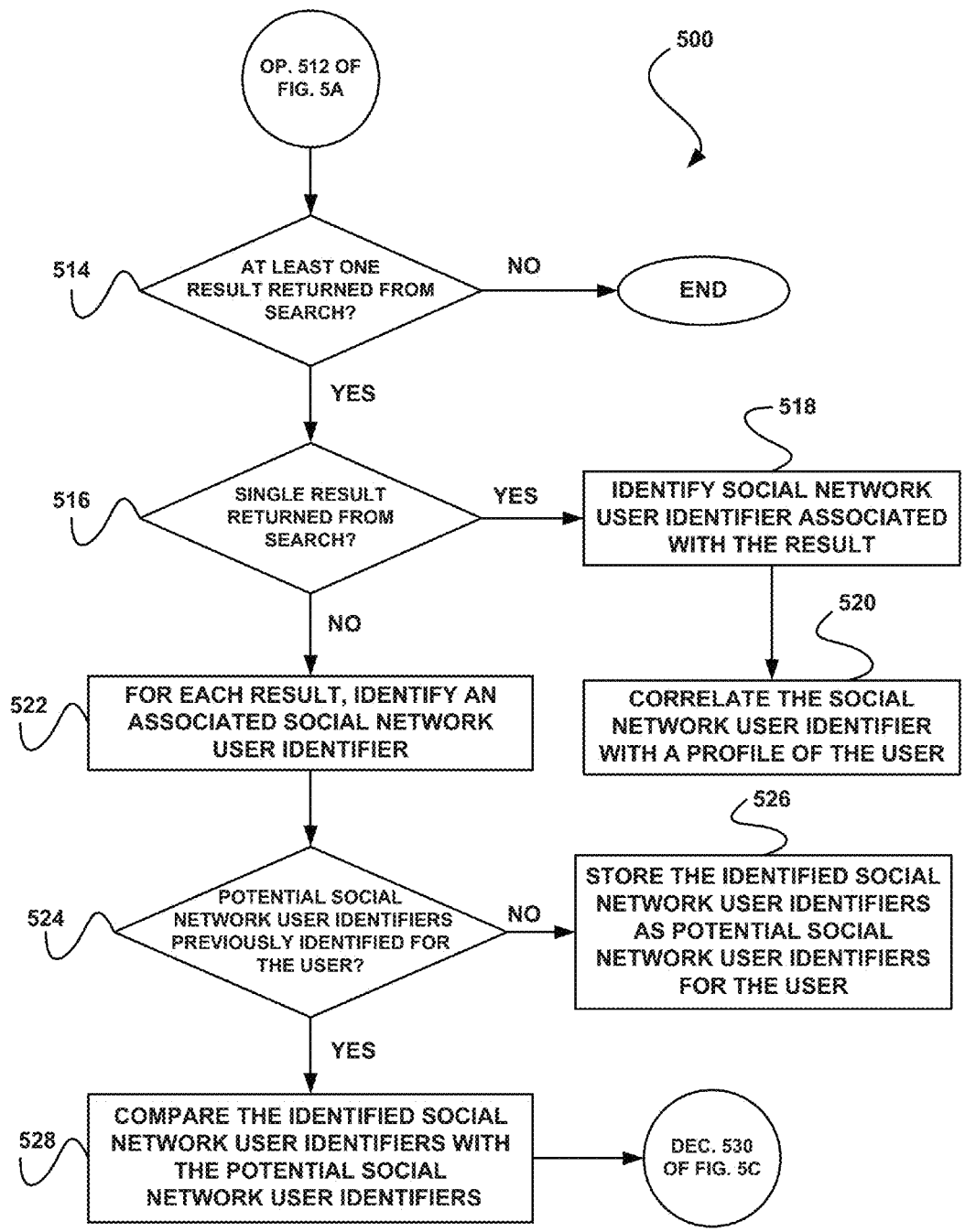
Figure 5C:
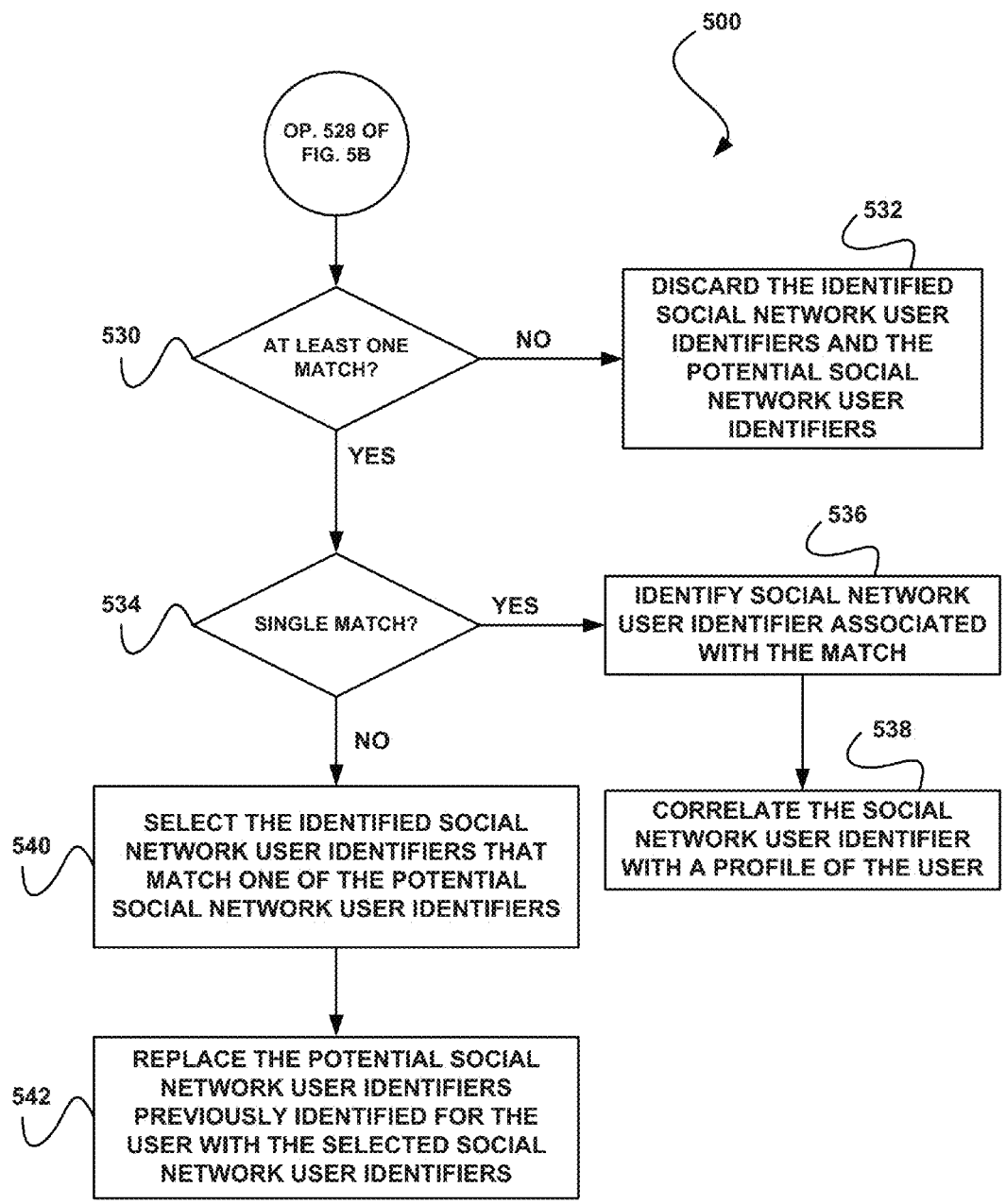

FIGS. 5A-C illustrate a method 500 for correlating a social network user identifier for a user with a profile of the user, in accordance with another implementation consistent with aspects related to the present invention. As an option, the method 500 may be carried out in the context of the details of FIGS. 1-4. For example, the method 500 may be carried out utilizing the searching module 410 of FIG. 4. Of course, however, the method 500 may be carried out in any desired environment. Again, the aforementioned definitions may equally apply to the description below.

As shown in operation 502, a message is received from a user. For example, the message may be received by a service provider utilizing for transmitting the message from a device of the user to a social network device providing a social network. As another example, the message may be received from a transaction log storing messages received from users.

Additionally, content is extracted from the message. Note operation 504. The content may include an identifier of the user and a body of the message. Optionally, such identifier of the user may include an identifier of source of the message. Thus, the identifier may identify a device from which the message was received.

It is then determined whether a social network identifier of the user is known, as shown in decision 506. For example, a database of user profiles may be queried utilizing the identifier of the user extracted from the message. Such query may determine whether the database stores a profile for the user that includes a social network identifier of the user (i.e., in which the identifier of the user is mapped to a social network identifier of the user). In particular, the query may optionally determine whether such identifier of the user is mapped to an identifier of the user provided by the social network to which the message was transmitted by the user.

If it is determined that such that the social network identifier of the user is known, the method 500 ends. If, however, it is determined that the social network identifier of the user is not known, at least a portion of the content extracted from the message is selected. Note operation 508. For example, the portion of the content or entirety thereof may be selected based on a predetermined algorithm.

A search is then performed using the selected portion or entirety of the content, as shown in operation 510. It should be noted that the search may be performed within any predetermined location. For example, the search may be performed within a plurality of social networks, a single social network, the Internet, etc. Optionally, the search may be performed a predetermined amount of time (e.g., zero seconds, a minute, etc.) after the receipt of the message (or the transmittal of the message as extracted from the content of the message), for allowing the social network time to be updated based on the message.

Results of the search are then received, as shown in operation 512. Each result may indicate content matching the selected portion or entirety of the content for which the search was performed, in addition to an identifier of a user provided by a social network (i.e., social network user identifier) by which the matching content was published (e.g., via the social network). It should be noted that in operation 514 optionally no results may be received.

As shown in decision 514, it is determined whether at least one result was returned from the search. If it is determined that at least one result was not returned from the search (i.e., that no results were returned), the method 500 ends. While not shown, it should be noted that if it is determined that at least one result was not returned from the search, the method 500 may optionally repeat the search of operation 510 after a predetermined amount of time (e.g., to account for the social network to which the message was transmitted not yet being updated based on the message). The predetermined period of time may include zero seconds, a minute, etc. The repeat of operation 510 may be performed in the above described manner a predetermined number of times, as an option. As an option, the predetermined amount of time may change (e.g., be increased or decreased) as a function of a number of times that the search has been repeated.

If, however, it is determined that at least one result was returned from the search, it is further determined whether a single result was returned from the search. Note decision 516. If a single result was returned from the search, a social network user identifier associated with the result is identified, as shown in operation 518. Such social network user identifier is then correlated with a profile of the user. Note operation 520. For example, the social network user identifier may be stored in a profile of the user which stores the identifier of the user extracted from the message.

If a single result was not returned from the search (i.e., multiple results were returned from the search), a social network user identifier associated with each result is identified. Note operation 522. Moreover, it is determined whether potential social network user identifiers were previously identified for the user, as shown in operation 524. For example, the profile of the user may map the identifier of the user extracted from the content with social network user identifiers identified for the user from a previous message received from the user.

If it is determined that potential social network user identifiers were not previously identified for the user, the social network user identifiers identified in operation 522 are stored as potential social network user identifiers for the user. Note operation 526. For example, such social network user identifiers may be stored in the profile of the user as potential social network user identifiers for the user, for use with respect to a subsequent message received from the user.

If it is determined that potential social network user identifiers were previously identified for the user, the social network user identifiers identified in operation 522 are compared with the potential social network user identifiers. Note operation 528. It is then determined in decision 530 whether there is at least one match between the social network user identifiers identified in operation 522 and the potential social network user identifiers. If there is not at least one match, the social network user identifiers identified in operation 522 and the potential social network user identifiers are discarded (i.e., not stored in the profile of the user). Note operation 532.

If, however, there is at least one match, it is determined whether there is a single match, as shown in decision 534. In particular, the single match may include a single one of the social network user identifiers identified in operation 522 matching one of the potential social network user identifiers. If there is a single match, the social network user identifier associated with the match is identified, as shown in operation 536. In addition, such social network user identifier is correlated with the profile of the user, as shown in operation 538. For example, the social network user identifier may be stored in the profile of the user which stores the identifier of the user extracted from the message.

If it is determined that there is not a single match (i.e., that there are multiple matches), the social network user identifiers identified in operation 522 that each match one of the potential social network user identifiers are selected. Note operation 540. Furthermore, as shown in operation 542, the potential social network user identifiers previously identified for the user are replaced (e.g., in the profile of the user) with the selected social network user identifiers. In this way, such selected social network user identifiers may be stored in the profile of the user as potential social network user identifiers for the user, for use with respect to a subsequent message received from the user.

In one exemplary embodiment, upon receipt of a message sent by a user to an access number of a social network (e.g., during the transmittal of an SMS or via logs/messages sent as a result), a predetermined amount of time may be allowed to pass, and then a search may be performed for a portion of text included in the message within the social network. Such portion may exclude some of the text, may be limited to a subset of the text, or may include the entire text. There may be zero or more results (e.g., tweets in the case of the social network being Twitter™) from the search. If there are zero results, the search may be repeated one or more times with a predetermined time interval between the searches, until at least one result is returned from the search. If there is at least one result, an originator of the message in the social media is recorded (e.g., in the case of Twitter™, @xyz may be recorded where 'xyz' is the identity of the user provided by the social network).

If there are multiple results, a set of potential social network user identifiers is created from the results and stored in association with an identifier of the user. The next time the user sends a message (e.g., a tweet), a comparison between the results of the search associated with such subsequently sent message and the stored set of potential social network user identifiers may be performed. If the comparison results in a single match, the social network user identifier matching one of the potential social network user identifiers is assigned to an identifier of the user from which the messages were sent (e.g., the phone number of the device of the user from which the messages were sent).

If the comparison results in zero matches, it may be determined that one of the search results was inconsistent and thus both the results of the search associated with the last sent message and the stored set of potential social network user identifiers may be discarded. As another option, a score may be given to each result of the search associated with the last sent message and to each of the potential social network user identifiers based on a degree of relevancy and proximity in time between the publication of the content on the social network and the transmittal of the message from the user. The result of the search associated with the last sent message or the potential social network user identifier with the lowest score may then be discarded, and the remaining ones of the results of the search associated with the last sent message and the potential social network user identifiers may be saved as a new set of potential social network user identifiers. This type of discarding may be performed after each message received from the user for narrowing the set of potential social network user identifiers.

As another option, if the potential social network user identifiers are identified and stored, a confidence score associated with such potential social network user identifiers may be determined (e.g., as a function of a degree of match or score of the potential social network user identifiers, the number of potential social network user identifiers, etc.). Such confidence score may be compared to a predetermined threshold of confidence. Thus, if the confidence score is below the predetermined threshold of confidence, a person may manually confirm whether any of the potential social network user identifiers include identifiers of the user (from which the message was sent) that are provided by the social network.

While various aspects consistent with implementations related to the present invention have been described above, it should be understood that they have been presented by way of example only, and not limitation. Thus, the breadth and scope of a preferred embodiment should not be limited by any of the above-described exemplary implementations, but should be defined only in accordance with the following claims and their equivalents.

What is claimed is:
1. A computer program embodied on a non-transitory computer readable medium, comprising computer code for:
   receiving, by a system, a message from a user, the message having at least a body entered by the user and an identifier of the user;
   responsive to receiving the message:
     (a) extracting, by the system, the body from the message;
     (b) identifying, by the system from the extracted body of the message, the identifier of the user;
     (c) using the identifier of the user, determining that a social network identifier of the user is not known by the system;
     (d) initiating, by the system, a search of one or more social networks using at least a portion of the extracted body of the message;
     (e) receiving a plurality of results of the search, where each of the plurality of results includes:
       social network content published to one of the social networks that matches the at least a portion of the extracted body of the message, and
       an identifier of an account of the one of the social networks used to publish the social network content;

(f) storing the identifiers of the accounts for the plurality of results within a profile of the user as a plurality of potential social network accounts for the user;

receiving, by the system, another message from the user, the other message having at least a body entered by the user and the identifier of the user;

responsive to receiving the other message, repeating by the system (a)-(e) for the other message;

determining, by the system, that there is a single match between the potential social network accounts stored in the profile of the user and an identifier of an account included in the results of the search initiated for the other message;

responsive to the system determining that there is a single match, assigning, by the system, the matched identifier of the account of the social network to the identifier of the user.

2. The computer program of claim 1, wherein the message includes a short message service (SMS) message.

3. The computer program of claim 1, wherein the body of the message includes text included in the message.

4. A method, comprising:

receiving, by a system, a message from a user, the message having at least a body entered by the user and an identifier of the user;

responsive to receiving the message:
 (a) extracting, by the system, the body from the message;
 (b) identifying, by the system from the extracted body of the message, the identifier of the user;
 (c) using the identifier of the user, determining that a social network identifier of the user is not known by the system;
 (d) initiating, by the system, a search of one or more social networks using at least a portion of the extracted body of the message;
 (e) receiving a plurality of results of the search, where each of the plurality of results includes:
  social network content published to one of the social networks that matches the at least a portion of the extracted body of the message, and
  an identifier of an account of the one of the social networks used to publish the social network content;
 (f) storing the identifiers of the accounts for the plurality of results within a profile of the user as a plurality of potential social network accounts for the user;

receiving, by the system, another message from the user, the other message having at least a body entered by the user and the identifier of the user;

responsive to receiving the other message, repeating by the system (a)-(e) for the other message;

determining, by the system, that there is a single match between the potential social network accounts stored in the profile of the user and an identifier of an account included in the results of the search initiated for the other message;

responsive to the system determining that there is a single match, assigning, by the system, the matched identifier of the account of the social network to the identifier of the user.

5. A system, comprising:

a processor for:

receiving, by the system, a message from a user, the message having at least a body entered by the user and an identifier of the user;

responsive to receiving the message:
 (a) extracting, by the system, the body from the message;
 (b) identifying, by the system from the extracted body of the message, the identifier of the user;
 (c) using the identifier of the user, determining that a social network identifier of the user is not known by the system;
 (d) initiating, by the system, a search of one or more social networks using at least a portion of the extracted body of the message;
 (e) receiving a plurality of results of the search, where each of the plurality of results includes:
  social network content published to one of the social networks that matches the at least a portion of the extracted body of the message, and
  an identifier of an account of the one of the social networks used to publish the social network content;
 (f) storing the identifiers of the accounts for the plurality of results within a profile of the user as a plurality of potential social network accounts for the user;

receiving, by the system, another message from the user, the other message having at least a body entered by the user and the identifier of the user;

responsive to receiving the other message, repeating by the system (a)-(e) for the other message;

determining, by the system, that there is a single match between the potential social network accounts stored in the profile of the user and an identifier of an account included in the results of the search initiated for the other message;

responsive to the system determining that there is a single match, assigning, by the system, the matched identifier of the account of the social network to the identifier of the user.

6. The system of claim 5, wherein the processor is coupled to memory via a bus.

* * * * *